US008444901B2

(12) United States Patent
Sindt et al.

(10) Patent No.: US 8,444,901 B2
(45) Date of Patent: May 21, 2013

(54) METHOD OF FABRICATING A HIGH TEMPERATURE PROGRESSIVE CAVITY MOTOR OR PUMP COMPONENT

(75) Inventors: Olivier Sindt, Cheltenham (GB); Hossein Akbari, Bristol (GB); Julien Ramier, Cheltenham (GB)

(73) Assignee: Schlumberger Technology Corporation, Sugar Land, TX (US)

(*) Notice: Subject to any disclaimer, the term of this patent is extended or adjusted under 35 U.S.C. 154(b) by 361 days.

(21) Appl. No.: 11/967,985

(22) Filed: Dec. 31, 2007

(65) Prior Publication Data

US 2009/0169404 A1 Jul. 2, 2009

(51) Int. Cl.

| | |
|---|---|
| ***B29C 45/14*** | (2006.01) |
| ***B28B 19/00*** | (2006.01) |
| ***B28B 7/36*** | (2006.01) |
| *F04C 5/00* | (2006.01) |
| *F04C 15/00* | (2006.01) |

(52) U.S. Cl.
USPC ............. 264/269; 264/267; 264/338; 418/48; 418/152; 418/153

(58) Field of Classification Search
None
See application file for complete search history.

(56) References Cited

U.S. PATENT DOCUMENTS

| | | | | |
|---|---|---|---|---|
| 6,170,572 | B1 * | 1/2001 | Fulbright et al. | 166/68.5 |
| 6,881,045 | B2 * | 4/2005 | Zitka et al. | 418/48 |
| 6,887,420 | B2 * | 5/2005 | Heilig et al. | 264/338 |
| 6,984,353 | B2 * | 1/2006 | Asai et al. | 264/304 |
| 2004/0258548 | A1 | 12/2004 | Zitka et al. | |
| 2005/0089429 | A1 * | 4/2005 | Delpassand et al. | 418/48 |

FOREIGN PATENT DOCUMENTS

| | | | |
|---|---|---|---|
| DE | 2541779 | | 3/1977 |
| DE | 2722623 | | 12/1977 |
| EP | 1406016 | | 4/2004 |
| EP | 1522366 | A1 | 4/2005 |

OTHER PUBLICATIONS

Hexion Specialty Chemicals, Inc., Technical Data Sheet: EPON(TM) Resin 863, Jun. 2004.*

Hexion Specialty Chemicals, Inc., Technical Data Sheet: EPON(TM) Resin 826, Sep. 2005.*

The Dow Chemical Company, Product Information: D.E.R.(TM) 331(TM), 2010.*

"The Stator-an essential PCP element," Internet citation (on line) XP 000962595, url: HTTP//www.Netzsch-Pumps.com/E_Techn/TECH_STA.html (retrieved Apr. 25, 2005).

* cited by examiner

*Primary Examiner* — Christina Johnson
*Assistant Examiner* — Benjamin Schiffman
(74) *Attorney, Agent, or Firm* — Kimberly Ballew

(57) ABSTRACT

The present application discloses a progressive cavity motor or pump component, either stator or rotor, which provides a high glass transition temperature polymeric surface on the component which becomes resilient at or below the expected operating temperature of the motor or pump, but which remains solid at ambient temperatures, along with a method of fabricating either a stator or a rotor with such surface characteristics. Since the surface becomes resilient, the progressive cavity pump operates efficiently at temperatures above the glass transition temperature of the selected polymeric surface.

7 Claims, 5 Drawing Sheets

METHOD OF FABRICATING A HIGH TEMPERATURE PROGRESSIVE CAVITY MOTOR OR PUMP COMPONENT

BACKGROUND OF THE INVENTION

1. Field of the Invention

The present invention relates to the manufacture and use of high temperature progressive cavity motor or pump components; and more specifically, to the manufacture and use of motor, or pump, stators or rotors providing a polymeric surface having a glass transition temperature between 50° C. and 180° C. to permit a hard polymer to become resilient in operation, and remain solid at lower temperatures.

2. Related Art

There are numerous attempts at coating the surface of a progressive cavity motor components, both stators and rotors, with polymers. So are as known to applicants, no attempt has been made to fabricate a surface on either of these components with a high glass transition temperature polymer or blend of polymers to permit resiliency of the surface only at operating temperatures. The operating efficiency of a progressive cavity motor requires that at least one surface of the motor be sufficiently resilient to repeatedly seal against the hydraulic pressure of the fluid moving through the motor. While most of the description contained herein relates to stators fabricated with a high glass transition polymer, the reasons and benefits from such fabrication can be realized by fabricating a rotor with a high glass transition polymer and the claims and description set forth herein are intended to cover both stators and rotors, unless specifically limited to one or the other.

SUMMARY OF THE INVENTION

A progressive cavity drive component, which can either be a rotor or a stator, is made up of a component core; and, a polymeric surface affixed on said core to engage a complementary progressive cavity drive component, said polymeric surface having a glass transition temperature at least 20° C. below a planned operating temperature range for said progressive cavity drive component. The progressive cavity drive component core can be a rotor body and the complementary progressive cavity drive component can be a stator; alternatively, the progressive cavity drive component core can be a stator body and the complementary progressive cavity drive component is a rotor. The progressive cavity drive components, either stator or rotor, provides a surface on which a polymer selected from a group consisting essentially of: epoxy resins, polyimides, polyetherimides, polyetheretherketones, polyketones, phenolic resins, polysulfones or polyphenylene sulfides, is affixed.

The progressive cavity drive component of this embodiment can provide a polymer having uniform cross-sectional thickness on which the core surface is helically lobed in cross-section. Alternatively, the progressive cavity drive component, again either stator or rotor, can be fabricated wherein the polymer is helically lobed in cross-section on the core surface, which core surface can be of any regular geometric cross-section, e.g. round, oblong, hexagonal, pentagonal, etc.

The polymer affixed to the surface of the progressive cavity drive component has a glass transition temperature of between 50° C. and 180° C. Additionally, the progressive cavity drive component polymer surface can be formed with a creep-resistant semi-crystalline polymer.

The progressive cavity drive component can provide a polymer composite matrix reinforced by materials selected essentially from a group including graphite whiskers, silicon nitride whiskers, aluminum oxide whiskers, silicon carbide whiskers, aluminum oxide fibers, aramid fibers, carbon fibers, E-glass fibers, boron fibers, silicon carbide fibers, steel wire, molybdenum wire, tungsten wire, nanosilica particles, nanocarbon tubes or nanocarbon fibers. The term whisker is used to describe very thin single crystals that have extremely large length-to-diameter ratios. As a consequence of their small size, they have a relatively high degree of crystalline perfection and are substantially flaw free, accounting for their exceptional strength. The fibers are polycrystalline or amorphous and have small diameters. Fine wires have long been used as reinforcing materials in polymers and are well known in this art.

The progressive cavity drive component can also be covered by an layer of a second material, which can be either an elastomer to provide a sealing engagement with the complementary drive component before the high operating temperatures are reached or to protect the affixed polymer layer covered by the second layer. The outer layer of the second material can be selected from the group consisting of elastomers, or other polymers have glass transition temperatures differing from the base covered layer of polymer.

Applicants therefore disclose a progressive cavity motor stator comprising a stator body having a longitudinal bore providing an inner surface; and, a polymeric layer bonded on the inner surface of the stator body, said polymeric layer composed of a polymer having a glass transition temperature of between 50° C. and 180° C. and providing a helical profile to compressively mate with a progressive cavity rotor at operating temperatures above such glass transition temperature. This progressive cavity motor stator can have an inner surface of the stator body which provides a circular cross-section, and the polymeric layer attached to the inner surface of the stator thereby providing a helically-lobed cross-section in the longitudinal bore of the stator body. The progressive cavity motor stator can alternatively have an inner surface of the stator body which provides a helical cross-section and the polymeric layer bonded to said inner surface which is uniform in thickness.

Additionally, a progressive cavity motor rotor is disclosed which is comprised of a rotor body having an outer surface; and, a polymeric layer bonded on the outer surface of the rotor body, said polymeric layer composed of a polymer having a glass transition temperature of between 50° C. and 180° C. and providing a helical profile to compressively mate with an inner surface of a progressive cavity stator at operating temperatures above such glass transition temperature. Again, the progressive cavity motor rotor can provide the outer surface of the rotor body having a non-helically-lobed cross-section, and the polymeric layer is attached to the outer surface of the rotor providing a helically-lobed cross-section. Alternatively, the progressive cavity motor stator can be fabricated with the outer surface of the rotor body having a helically-lobed cross-section and the polymeric layer bonded to said outer surface is uniform in thickness.

Applicants disclose a method of fabricating a progressive cavity motor stator comprising centralizing a helical mandrel having an outer surface smaller in diameter than then inner surface of a longitudinal bore of a stator body leaving a space between said inner surface of the stator body; filing said space between the outer surface of said helical mandrel and the inner surface of the longitudinal bore of the stator body with a polymer having a glass transition temperature of between 50° C. and 180° C.; affixing the polymer to the inner surface of the longitudinal bore of the stator body; and, removing the mandrel from the stator body. This method can be practiced wherein the polymer used to fill the space between the outer surface of the mandrel and the inner surface of the stator body is a high glass transition temperature material, solid at ambient temperature and resilient at temperatures at least 20° C. beyond its glass transition temperature. The hardness of the polymeric surface at ambient temperatures can be adjusted by the choice of appropriate polymers and admixtures, all in a manner well known to those skilled in the materials art.

Again, the method of manufacture of this stator requires selection of a polymer from a group consisting essentially of: epoxy resins, polyimides, polyetherimides, polyetheretherketones, polyketones, phenolic resins, polysulfone, or polyphenylene sulfide. By choosing an appropriately cross-linked polymer, this method also claim the method wherein the polymer is a creep-resistant semi-crystalline polymer.

The method of manufacture can also provide the selection of a polymer composite matrix reinforced by materials selected essentially from a group including graphite whiskers, silicon nitride whiskers, aluminum oxide whiskers, silicon carbide whiskers, aluminum oxide fibers, aramid fibers, carbon fibers, E-glass fibers, boron fibers, silicon carbide fibers, steel wire, molybdenum wire, tungsten wire, nanosilica particles, nanocarbon tubes or nanocarbon fibers. The definitions of whiskers has been described above.

The method of manufacture can further provide the additional steps of covering the mandrel with a releasing agent to permit removal of the mandrel without damage to the surface of the cured polymer; and, coating the interior surface of the stator body with a bonding agent to strengthen the bond between the core stator body and the applied polymer.

A method of fabricating a progressive cavity motor rotor is also described, comprising centralizing in a mold a rotor core having an outer surface smaller in diameter than an inner surface of a longitudinal bore of a mold leaving a space between an inner surface of the mold and the rotor core outer surface; filing said space between the outer surface of said rotor core and the inner surface of the mold with a polymer having a glass transition temperature of between 50° C. and 180° C.; affixing the polymer to the outer surface of the rotor core; removing the rotor from the mold; and, inserting the rotor core in the longitudinal bore of a stator body.

This method can further provide that the polymer used to fill the space between the outer surface of the rotor core and the inner surface of the mold is a high glass transition temperature solid at ambient temperature and resilient at temperatures at least 20° C. beyond its glass transition temperature and is selected from a group comprising of one or more of the following polymers: epoxy resins, polyimides, polyetheretherketones, polyketones, phenolic resins, polysulfone, or, polyphenylene sulfide.

This method can also provide a polymer which is cross-linked and therefore a creep-resistant semi-crystalline polymer. Similar to the claims directed to the stator, this method can be altered to provide a polymer composite matrix reinforced by materials selected essentially from a group including graphite whiskers, silicon nitride whiskers, aluminum oxide whiskers, silicon carbide whiskers, aluminum oxide fibers, aramid fibers, carbon fibers, E-glass fibers, boron fibers, silicon carbide fibers, steel wire, molybdenum wire, tungsten wire, nanosilica particles, nanocarbon tubes or nanocarbon fibers, as described above.

Further, and additionally, the method can provide the additional step of covering the interior surface of the mold with a releasing agent to permit removal of the rotor core and polymer without damage to the surface of the cured polymer, or the additional step of coating the outer surface of the rotor core with a bonding agent, or both as required by the polymer being used to form the surface on the rotor.

DETAILED DESCRIPTION

Figure 1:
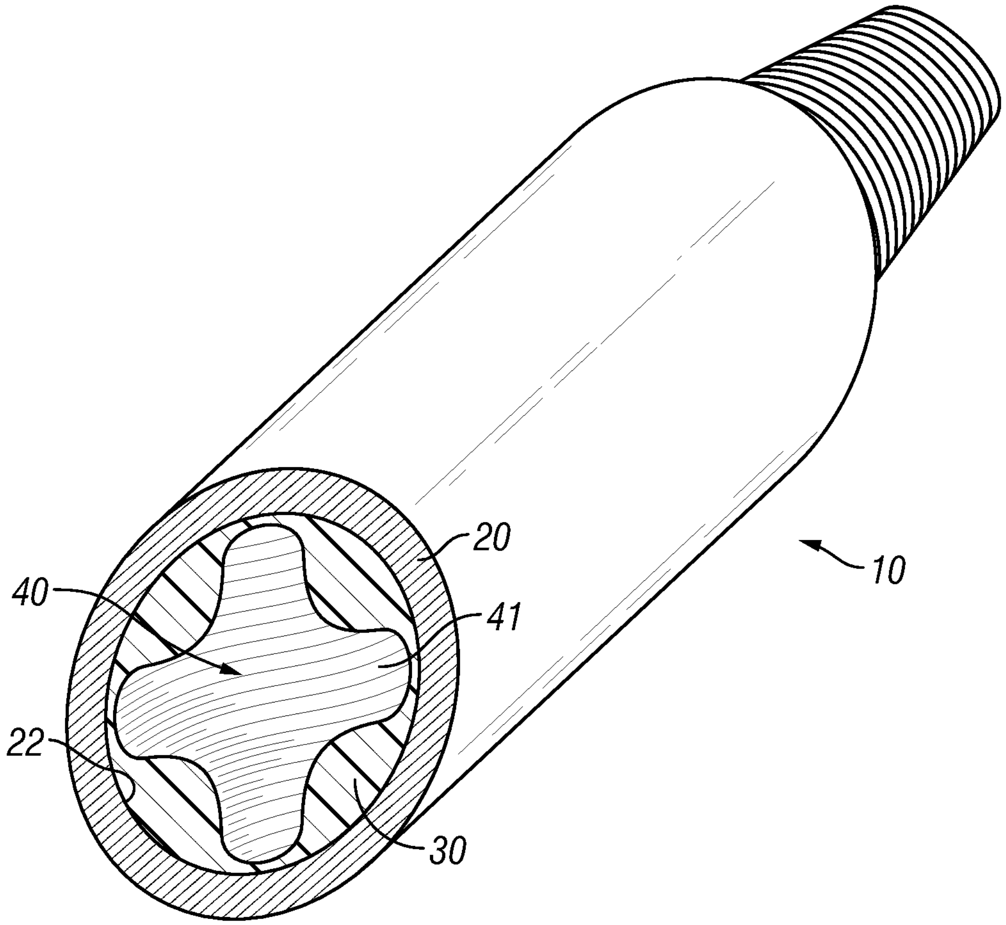
FIG. 1 is a perspective drawing of a stator body of a progressive cavity motor with a cross section of the body, and a polymer helical interior.

FIG. 1 is a perspective drawing of the high temperature stator 20 of the present invention with a cross-sectional view of the stator body 10, showing a high temperature polymer coating providing helical grooves 41 through the longitudinal axis 40 of the body 10. Stator tube 10 can be formed from an appropriate steel tube or other proper material well known in the progressive cavity motor fabrication industry and be cut to provide the final outer diameter and length desired for the stator assembly. A bonding agent, such as without limitation Cilbond 12E/80E, Cilbond 33A/B, Chemosil 211/, Chemosil 360, Chemosil NL411 with or without 211, Chemosil 512, Chemlok 207/6254, Chemlok 205/220, Sartomer interlayer TPU, is then spread over the internal surface 22 of the stator 20 to affix the high temperature polymer or composite to the stator. In other cases, such a bonding agent will not be required because the polymer bonds readily to the surface. For example, epoxy resins bond readily to steel. These production decisions are well known to those in this art and can be made based upon the choice of materials used for the fabrication of these tools. Such bonding agents can be either a single or a multi-layer bonding agent in accordance with the final production requirements of the polymer, and the choice of such materials—although well known to those in this industry—will be dependent upon the choice of selection of materials for the stator 20 and the polymer 30 selected to be bonded to the stator 20 interior on surface 22.

Next a mandrel (not shown) is centrally disposed within the steel stator body 10. This mandrel provides the final helical profile and dimension of the stator and is generally made of steel or other appropriate material and covered with a release agent, which are similarly well known in this art. The mandrel's geometry shapes the inner profile as the polymer is being fabricated; hence the mandrel's geometry generally will not be the same as the cavity inside the stator once the process is completed. For instance, the design of the mandrel will provide for shrinkage during cure of the polymer, crosslinking, or for thermal expansion effects when cooling the polymer and the stator tube 10 during the manufacturing process (i.e., "molding" of the polymer). Release agents can be either temporary release agents such as DuPont TraSys 423 or DuPont TraSys 307, both of which should be re-applied every time before molding; or permanent release agent such as PTFE from Fluorocarbon, or Apticote 460M from Poeton. The mandrel works to provide a male mold core and the release agent prevents or inhibits the bonding of the polymer to the mandrel surface. Each of the steps described herein are familiar to persons having ordinary skill in this art and should not require further explanation to enable such a person to practice the present invention.

Next, the void between the inner surface 22, which may also be bonding-agent coated if needed, of the stator body 20 and the exterior release-agent coated surface of the mandrel is filled with the selected polymer material. This polymeric material can take many forms. For example, many polymers are made available for such applications in liquid, paste, powder or granular form for injection into the form. The appropriate handling of the polymer and the curing technique may be material specific, but all are thought to be within the current knowledge of a person of ordinary skill in the art. For example, injection molding (for thermoplastic polymers), casting from liquid state (for thermosetting polymers), gravity feeding, powder compaction and heat curing, are all well known to those having ordinary skill in this fabrication art. High temperature polymers and composite which might be used (without limitation) are epoxy resins, polyimides, polyetherimides, polyetherketones, polyetheretherketones (PEEK), polyketones, phenolic resins, polysulfone (PSU), polyphenylene sulfide (PPS) and similar materials are believed to be critical to effective operational characteristics of the completed stator 10 to rely upon cross-linked or semi-crystalline polymers to limit creep during operation of the progressive cavity motor.

Care should be taken, depending on how the polymeric material is cured, in selecting either the stator body's material or the curing process, since the thermal heat expansion of the stator body and mandrel during the curing process can have an effect on the final shape of the inner profile. Furthermore, the difference in coefficients of thermal expansion between the polymer and the stator body's material is a property that permits the polymer surface to selectively engage the outer surface of the rotor to form an efficient motor or pump, after the polymer has reached passed its glass transition temperature $T_g$. Similarly, if the surface is fabricated on the outer surface of the rotor, as more fully described below, care should be taken to select a polymer have the proper glass transition temperature and coefficient of thermal expansion to loosely fit the stator at ambient temperature, yet seal the progressive cavity motor or pump during operation at the expected higher temperatures. Since the present embodiment is expected to service oil and gas wells having operating temperatures between 70° C. and 230° C., suggesting a high glass transition temperature polymer of between 50° C. and 180° C.

Next, the polymeric coating or lining is cured after insertion in the void between the mandrel and the outer body 20 of the stator 10 to impart the permanent helical profile to the internal surface of the stator 10. Such curing can be accomplished by heat curing, radiation or if poured in a molten state by appropriate cooling for thermoplastics. Any form of electromagnetic radiation can be used from the infrared to the high energy frequencies beyond the ultraviolet, as required to cure the polymer or composite chosen for this purpose. For example, ultraviolet curing of the most common epoxy compounds is accomplished at 300-325 nm wavelength, while epoxysiloxanes require higher energy radiation having a wave length of less than 255 nm.

The stator 10 manufactured in this manner can be used with conventional rotors. Because of the difference in thermal expansion coefficients between the steel tube 20 (typically between 15 to 20 ppm/° C.) and the polymer (typically a few times larger than those of steel), the internal profile of the stator 10 can be designed to provide a loose fit between the stator and rotor at ambient or low temperatures, compared to the operating temperature. When operating temperatures are achieved, the polymeric coating will expand more than stator body 20, leading to an expansion of the polymer axially inward in the stator profile, thereby tightening the fit between the rotor 50 (shown schematically in FIG. 2) and the stator 10. Moreover, at operating temperatures experienced in oil and gas wells, the high glass transition temperature polymer becomes resilient because it goes through its glass transition zone and thus provides the right mechanical properties to seal the cavities of the progressive cavity motor. The fit between the rotor and the stator at ambient temperature is loose and the surfaces of each do not engage. When raised to operating temperature, the difference in thermal expansion coefficients will develop the interference, hence making the system work "efficiently." The operating seal between the stator and the rotor becomes greater at operating temperatures because at this temperature, the high temperature polymer is above its glass transition temperature (hence it is in its rubbery state), resulting in a highly efficient progressive cavity motor. It can be readily recognized that this technology, although intended for use in oil and gas progressive cavity motor drilling operations, may be adapted to pump applications where the operating temperature of the materials being pumped are within the rubber plateau of the polymer used on the stator interior surface, without departing from the spirit or purpose of this invention. Furthermore, this technology is not limited to the specific geometries reflected in the drawings, but can be adapted to any Moineau-type motor or pump.

The designed loose fit between the stator 10 and rotor 50 has the added benefit of making the insertion of the rotor 50 inside the stator profile at ambient temperatures easy and efficient. If the fit is tight, the rotor 50 can still be inserted by raising the temperature of the stator 10 to approximate the glass transition temperature of the stator's polymer 30.

Figure 2:
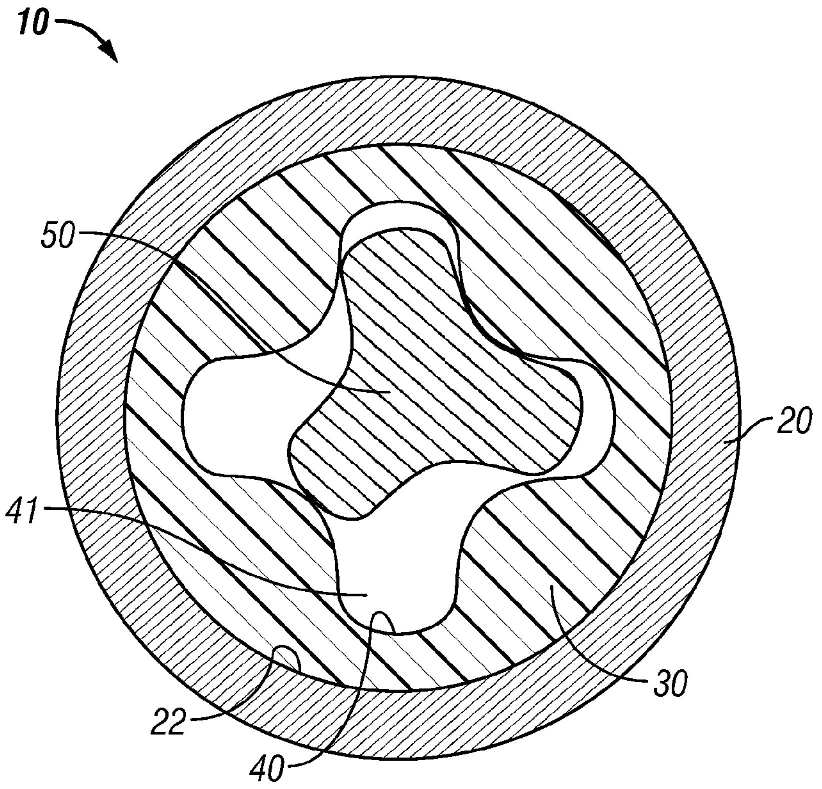
FIG. 2 is a cross section drawing of a stator body of a progressive cavity motor.

FIG. 2 is a cross-sectional view of a stator 10, a steel tube body 20 having an interior surface 22 substantially circular. Stator body 20 interior surface 22 is coated with the bonding agent, a mandrel (not shown) is centrally located and the polymeric material 30 inserted, the mandrel removed leaving an interior longitudinal bore 40 providing a helical profile 41. A standard rotor 50 used in progressive cavity motors can be inserted to complete the motor or pump.

Figure 3:
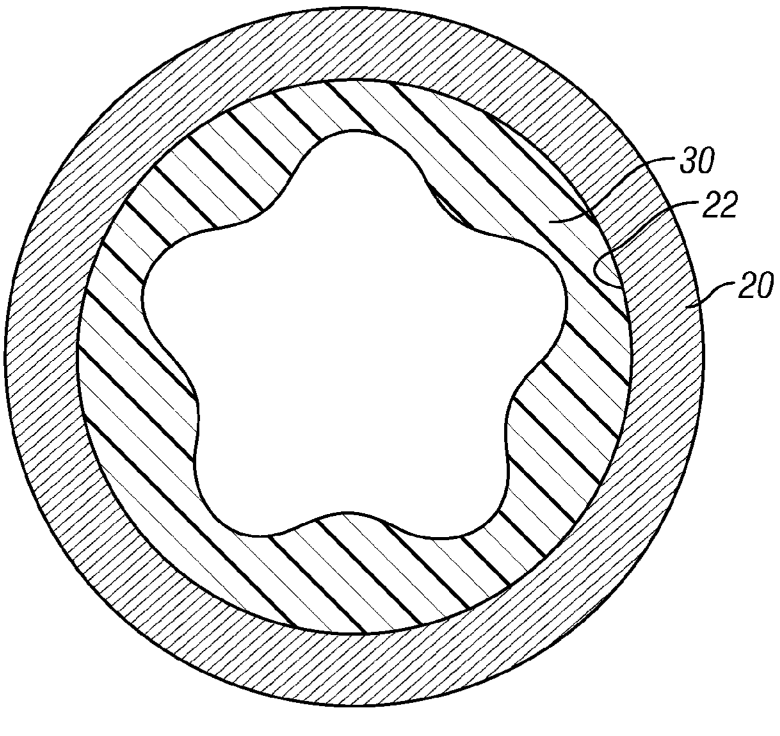
FIG. 3 is a detailed cross-sectional drawing of a stator body having a circular interior surface and a polymeric helically shaped interior lining.

FIG. 3 shows a closer view of the circular cross section showing a five lobed stator 20 providing interior circular surface 22 and polymer coating 30, adaptable for use with a four lobed rotor (not shown). The polymer lining or coating 30 is formed on and bonded to the interior surface 22 of the stator 20 in using methods more fully described in pending application SLB 92.1136, which is incorporated herein by reference as if fully copied herein.

Figure 3A:
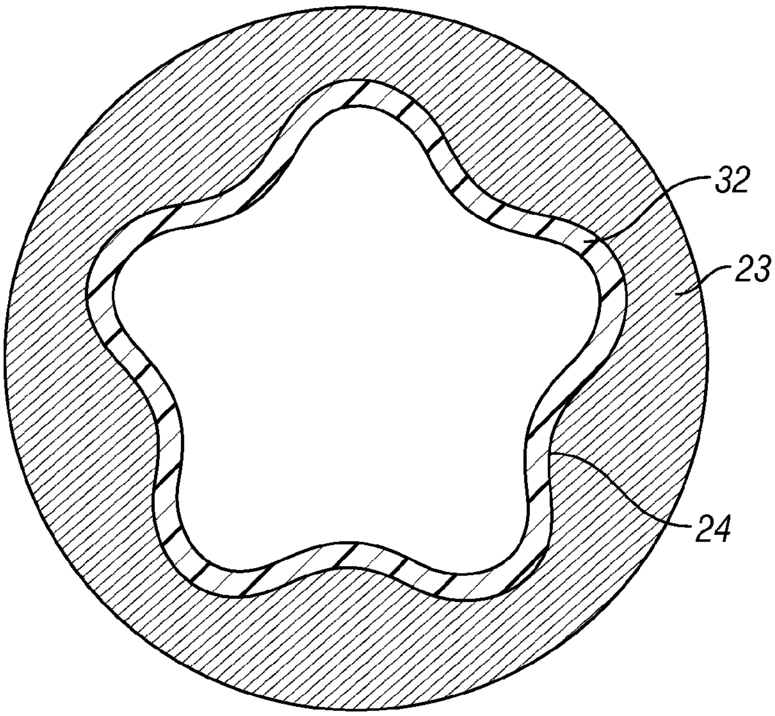
FIG. 3A is an alternative detailed cross-sectional drawing of a stator body having a helically shaped interior surface and a uniform polymeric lining.

Alternatively, another five-lobed stator 23 can be formed or machined with a helical interior surface 24 as more closely shown in FIG. 3A, and a polymeric coating 32 providing a uniform thickness may be formed and bonded to this helical interior surface 24 for use—again—with a four-lobed rotor (not shown).

The polymeric surface of the stator 30 is composed of a polymer or blend of polymers having a glass transition temperature at least 20° C., and preferably between 40° C. and 50° C., below the average operating temperature of drilling mud at predicted well depth such that as the operating temperature rises to the glass transition temperature of the stator, the polymeric lining becomes resilient permitting a highly efficient seal to be formed between the lobes of the rotor and the helical lobes of the interior surface of the stator in a manner well known in this art. The glass transition temperature required for the operation of this invention would fall within the range of between 50° C. and 180° C.

A helical rotor (not shown) is provided having an outer diameter less than the diameter of the polymeric lining 30 on the inner surface of the stator body at all temperatures below the glass transition temperature of the polymeric coating, thereby permitting rapid assembly of the completed motor at ambient temperatures.

The choice of polymeric coating having an appropriate glass transition temperature range is critical to the successful implementation of this invention. The glass transition temperature $T_g$ is the temperature below which the physical properties of amorphous materials vary in a manner similar to those of a crystalline phase (glassy state) and above which behave like viscous liquids (rubbery state). Above $T_g$, the secondary, non-covalent bonds between the polymer chains become weak in comparison to thermal motion and the polymer become rubbery and capable of elastic or "plastic" deformation without fracture and will be able to recover most of the deformation once the stress applied is removed.

Figure 4:
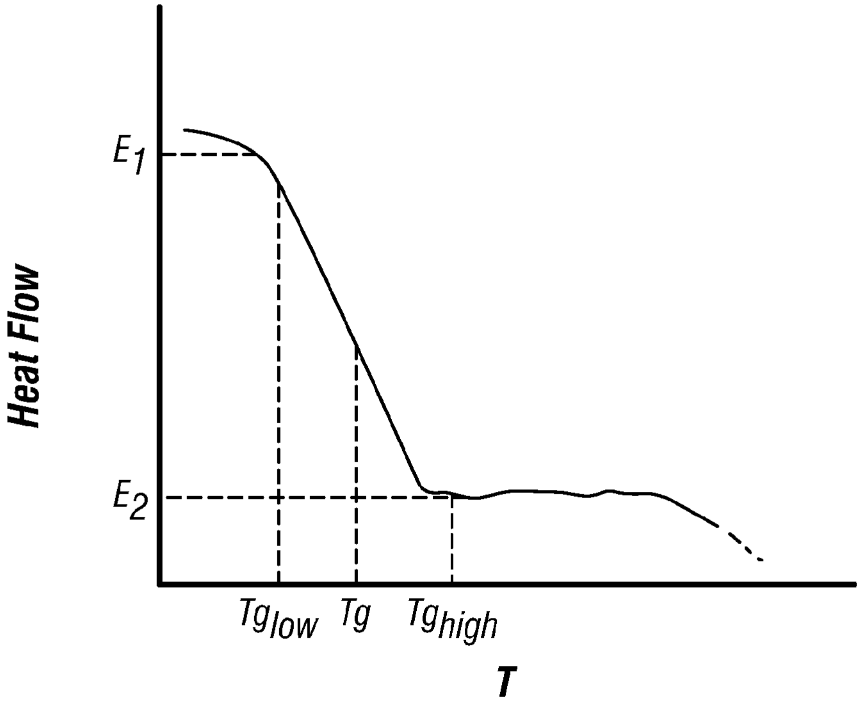
FIG. 4 is a schematic diagram of a DSC graph showing a relevant range of glass transition temperatures for a selected polymer.

A full discussion of $T_g$ requires an understanding of the mechanical loss mechanisms (vibrational and resonance modes) of specific functional groups and molecular arrangements. Factors such as heat treatment and molecular rearrangement, vacancies, induced strain and other factors affecting the condition of the material may have an effect on $T_g$. In polymers, $T_g$ is expressed as the temperature at which the Gibbs free energy is such that the activation energy for the cooperative movement of a substantial number of elements of the polymer is exceeded. This allows the molecular chains to slide past each other when a force is applied. The introduction of additives stiffens the molecular bond and hence increases $T_g$. As can be seen in FIG. 4, the heat flow drops as the glass transition temperature $T_g$ is reached and remains flat for some range of temperatures until the polymer crystallizes or melts (when the polymer is not chemically crosslinked). This flat range is called the rubber plateau.

The operating temperature of these components, either stators or rotors, will be such that it falls between $T_g$+20° C. and a temperature below the melting point of the high temperature polymer ($T_m$), if this polymer melts. It should be fully appreciated by those having skill in this art, that the melting temperature $T_m$ must be established for the polymer chosen to remain far above the normal operating range of the progressive cavity motor. If the operating temperature reached the $T_m$, the motor would fail. If operated in these temperature conditions, then the high temperature polymer will have some rubber-like mechanical properties. Also, as previously noted, its thermal expansion coefficients (CTE) will be such that the fit between the rotor and the stator develops, principally because of the relative difference between thermal expansion coefficient of the steel stator body or rotor and the polymer surface on the component.

Figure 5:
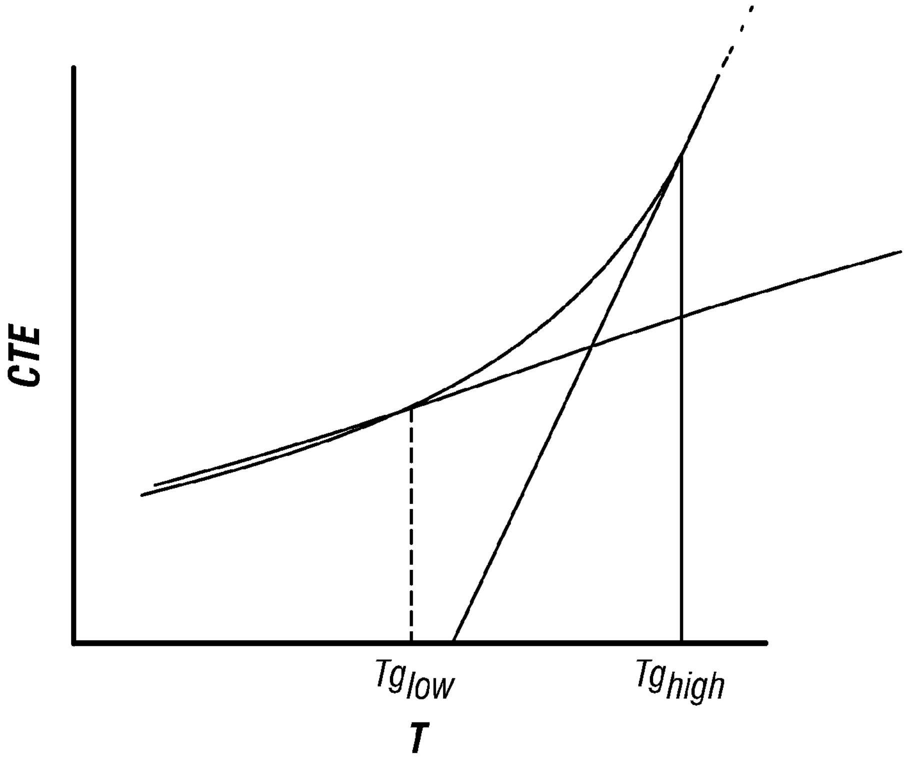
FIG. 5 is a schematic diagram of a TMA graph showing a relevant range of glass transition temperatures for a selected polymer.

FIG. 5 is an alternative manner of reflecting the glass transition temperature called a thermo-mechanical analysis (TMA) measure. TMA measures the change in the coefficient of thermal expansion (CTE) as a polymer goes from glass to rubber state with the associated change in free molecular volume. The range of appropriate temperatures for the polymer 30 chosen for this progressive cavity motor stator must fall within the range $T_{g(low)}$ to $T_{g(high)}$ on FIGS. 4 and 5, and additionally must be chosen to be at least 20° C., and preferably 50° C. to 80° C., below the expected operating temperatures of the progressive cavity motor.

As may be readily appreciated the DSC measures the heat effect and the TMA measures the physical effect. Both measures assume the effect occurs over a narrow range of a few degrees of temperature. Since the measurement of the polymer or blend is critical, both tests should be available when choosing an appropriate high $T_g$ polymer for use in the present invention. Measurement of the physical characteristics of the polymeric surface permits the appropriate design of an efficient motor for the expected operating temperature of the tool.

$T_g$ can be lowered by the addition of plasticizers into the polymer matrix. The smaller plasticizer molecules embed themselves between the polymer chains increasing the spacing and free volume allowing the chains to move past each other at even lower temperatures. If a plastic with some desirable characteristics has too high a $T_g$, it can be combined with another in a composite material with a $T_g$ below the temperature of the intended use. Alternatively, especially in the case of thermosetting materials, the appropriate initial chemicals (monomers) and chemical composition of the initial mixture can be adapted, in order to adapt the $T_g$ to the desired temperature (e.g., work on the stoichiometry between the resin and the hardener, use plasticizers, use of tri- or tetra-functional crosslinking hardeners, all within the skill of an ordinary materials design engineer and can be adapted for use in this application). All of these techniques are well known in this art field. Appropriate polymers can be selected from, but are not limited to the following: epoxy resins; polyimides, polyetheretherketones, polyetherketones, polyketones (PEEK, PEKK, PEK), phenolic resins, polyphenylene sulfide (PPS), and polysulfones (PSU). Blends of polymers may be designed by combination of these materials and others, all in a manner well known to the industrial chemical industry, to provide an appropriate range of glass transition temperature for the blend.

Figure 6:
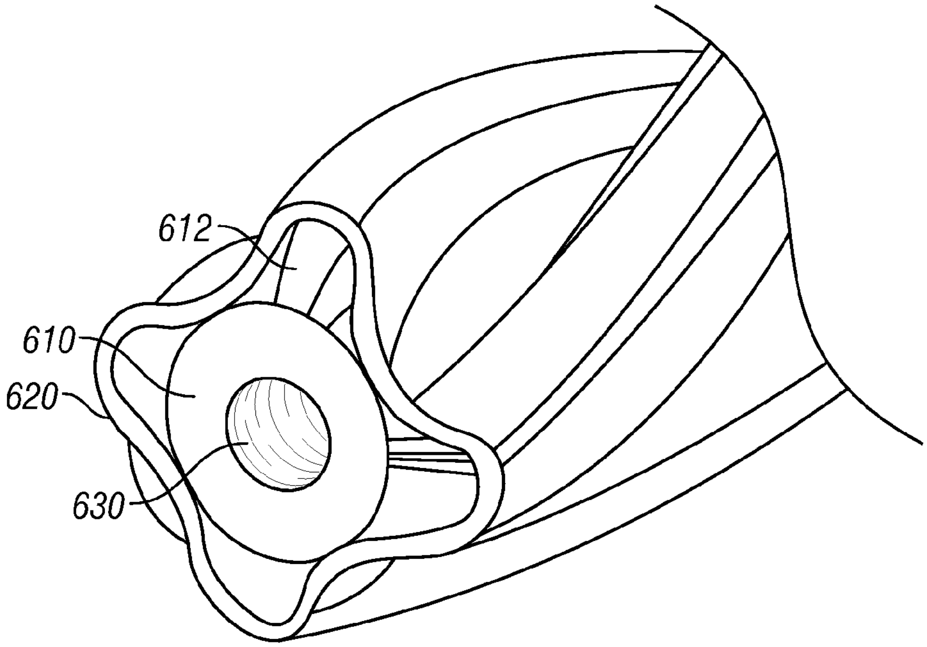
FIG. 6 is an end perspective view of a rotor covered with a high temperature polymer.

Similarly, a progressive cavity motor rotor can be coated with a high glass temperature polymer and used in a motor stator body. FIG. 6 is a representative schematic perspective view of such a rotor. A core 610 is inserted into and centralized in a mold (not shown) having the appropriate matching helical profile, all in a manner well known to those in the rotor fabrication art. Again, a bonding agent can be applied to the core 610 and the polymer 620 affixed to the rotor between the outer surface 612 of the core 610 and the inner surface of the mold (not shown). The inner surface of the mold can also be coated with an appropriate releasing agent to minimizing the polymer from sticking to the mold after curing, all as previously described in the discussion relating to the fabrication of the stator above. FIG. 6 also reveals a central longitudinal bore 630 through the core 610 which permits the core 610 to have a vacuum pulled on the outer surface 612 through ports in the core 610 to draw the polymer layer 620 into engagement during curing of the polymer, all in a manner currently practiced in this art. The mold would again be designed to provide a completed rotor diameter having a high $T_g$ polymeric coating after curing slightly smaller than the inner diameter of the stator at ambient temperature, such that after reaching the operating temperature, the rotor would efficiently expand to engage the inner surface of the stator to seal as needed for the efficient operation of the motor.

Figure 7:
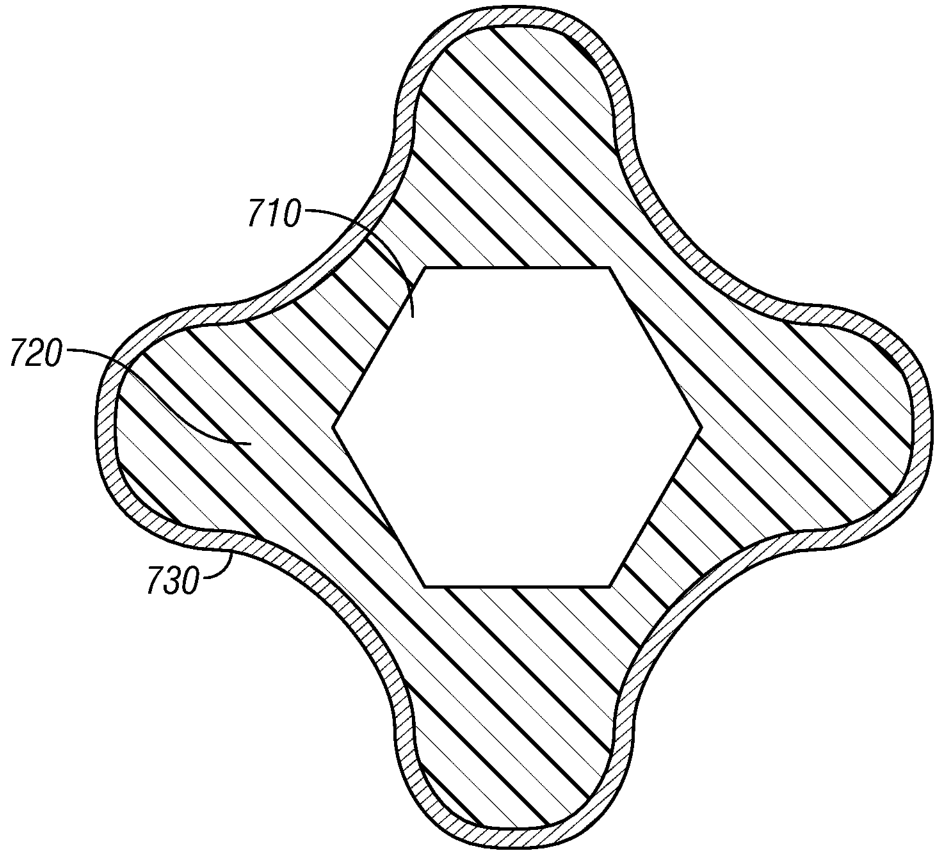
FIG. 7 is a cross-sectional view of another embodiment of a rotor covered with a high temperature polymer.

FIG. 7 is another embodiment of a high $T_g$ polymer coated rotor shown in cross section. This form of the coated rotor provides a solid core 710 covered in an appropriate high $T_g$ polymer 720 which is then covered with a thin outer layer 730, selected of other types of elatomeric materials, metal or other polymers. This outer layer 730 provides a protective sheath around the rotor during installation and initial operation of the rotor. The hexagonal shape of the core 710 reinforces the polymer from lateral forces experienced by the core when engaging the stator wall during operation. The actual cross section of the central core (hexagon in FIG. 7) is not limited to this shape: square, rectangular, triangular, octagon, round, oval, or other shapes can also be used. The use of alternative cores reduces the overall cost of fabrication because no precision machining of the rotor core to obtain a final helical shape is required. However, forming a helical shaped rotor or stator and covering the helical core with the high glass temperature polymer or blend of polymers is also within the scope of the claims and disclosure made herein.

Numerous embodiments and alternatives thereof have been disclosed. While the above disclosure includes the best mode belief in carrying out the invention as contemplated by the named inventors, not all possible alternatives have been disclosed. For that reason, the scope and limitation of the present invention is not to be restricted to the above disclosure, but is instead to be defined and construed by the appended claims.

What we claim is:

1. A method of fabricating a progressive cavity motor stator comprising:

centralizing a helical mandrel having an outer surface smaller in diameter than the inner surface of a longitudinal bore of a stator body leaving a space between said inner surface of the stator body;

filling said space between the outer surface of said helical mandrel and the inner surface of the longitudinal bore of the stator body with a polymer having a glass transition temperature of between 50° C. and 180° C.;

affixing the polymer to the inner surface of the longitudinal bore of the stator body;

removing the mandrel from the stator body;

providing a second layer with a glass transition temperature different than that of the affixed polymer and substantially covering the internal surface of the affixed polymer with the second layer; and sizing the affixed polymer and the second layer to create an internal profile for receiving a rotor with a loose fit at ambient temperatures such that the internal profile and the rotor do not operationally engage until the temperature is sufficiently raised to create an interference between the internal profile and the rotor.

2. The method of claim 1 wherein the polymer used to fill the space between the outer surface of the mandrel and the inner surface of the stator body is a high glass transition temperature material, solid at ambient temperature and resilient at temperatures at least 20° C. beyond its glass transition temperature.

3. The method of claim 1 wherein the polymer is selected from a group consisting essentially of: epoxy resins, polyimides, polyetherimides, polyetheretherketones, polyketones, phenolic resins, polysulfone, or polyphenylene sulfide.

4. The method of claim 1 wherein the polymer is a creep-resistant semi-crystalline polymer.

5. The method of claim 1 wherein the polymer is a polymer composite matrix reinforced by materials selected essentially from a group including graphite whiskers, silicon nitride whiskers, aluminum oxide whiskers, silicon carbide whiskers, aluminum oxide fibers, aramid fibers, carbon fibers, E-glass fibers, boron fibers, silicon carbide fibers, steel wire, molybdenum wire, tungsten wire, nanosilica particles, nanocarbon tubes or nanocarbon fibers.

6. The method of claim 1 wherein the method provides the additional step of covering the mandrel with a releasing agent to permit removal of the mandrel without damage to the surface of the cured polymer.

7. The method of claim 1 wherein the method provides the additional step of coating the interior surface of the stator body with a bonding agent.

* * * * *